United States Patent

[11] 3,533,461

| [72] | Inventor | Jacques Boileau<br>Clermont-Ferrand, France |
|---|---|---|
| [21] | Appl. No. | 684,226 |
| [22] | Filed | Nov. 20, 1967 |
| [45] | Patented | Oct. 13, 1970 |
| [73] | Assignee | Compagnie Generale des Etablissements<br>Michelin, raison sociale Michelin & Cie<br>Clermong-Ferrand (Puy-de-Dome), France |
| [32] | Priority | Nov. 21, 1966 |
| [33] | | France |
| [31] | | 84,406 |

[54] SUPPORT RINGS, CALLED "FLAPS", FOR PNEUMATIC TIRES
6 Claims, 4 Drawing Figs.

| [52] | U.S. Cl. | 152/365 |
|---|---|---|
| [51] | Int. Cl. | B60b 25/22 |
| [50] | Field of Search | 152/363, 365, 349, 400 |

[56] References Cited
UNITED STATES PATENTS

| 1,467,313 | 9/1923 | Gammeter | 152/365 |
|---|---|---|---|
| 1,620,818 | 3/1927 | Jacobs | 152/365 |
| 1,658,646 | 2/1928 | Michelin | 152/365 |

FOREIGN PATENTS

| 1,150,207 | 1/1958 | France | 152/365 |
|---|---|---|---|

*Primary Examiner*—Arthur L. La Point
*Assistant Examiner*—Charles B. Lyon
*Attorney*—Brumbaugh, Graves, Donohue & Raymond

ABSTRACT: An annular flap to protect the inner tube of a heavy-duty vehicle from damage by the tire and rim is made of an elastomer permanently deformable under the heat and pressure encountered in service. The central portion of the flap is thicker than the lateral portions and may be as much as 4 mm. thick. The lateral portions are less than 1.5 mm. thick.

Patented Oct. 13, 1970 3,533,461

INVENTOR.
JACQUES BOILEAU
BY
Brumbaugh, Free, Graves & Donohue
his ATTORNEYS

SUPPORT RINGS, CALLED "FLAPS", FOR PNEUMATIC TIRES

BACKGROUND OF THE INVENTION

This invention relates to a flap for protecting the inner tube of a heavy-duty vehicle from damage by the tire and rim and, more particularly, to a novel and highly-effective flap having lateral portions conforming closely to the fine structure of the interior surface of the tire in the vicinity of the beads to prevent pinching of the inner tube between the flap and the tire.

Conventional flaps are unsatisfactory in several respects. It has been found that the inner tube tends to be worn down and squeezed at the outer edges of the wings or lateral portions of the flap. The squeezing or pinching of the inner tube occurs between the outer edges of the wings or lateral portions of the flap and the inside surfaces of the sidewalls of the tire. This disadvantage is particularly pronounced in the case of tires vulcanized by conventional diaphragm presses. The curing diaphragm of these presses is formed with channels of various depths and various distances from one another intended to facilitate evacuation of the air from the space between the diaphragm and the tire to be vulcanized. These channels cause corresponding ribs to be formed on the inner sidewall of the tire, there being depressed portions between the ribs. The ribs and the spaces between them on the inner sidewalls of the tire facilitate the circulation of air between the flap and the inner sidewalls. The result is that the outer edges of the lateral portions of the flap tend to gape away from the sidewalls and to pinch or squeeze the inner tube between the flap and the sidewalls.

SUMMARY OF THE INVENTION

An object of the invention is to remedy the shortcomings of conventional flaps noted above. In particular, an object of the invention is to provide a flap preventing the squeezing or pinching of the inner tube between the flap and the tire.

Another object of the invention is to provide a flap having a greatly extended useful life.

A further object of the invention is to provide a flap of a given width and diameter adapted for use on rims having the same diameter but various widths, and with tires the beads of which are spaced apart various distances.

An additional object of the invention is to provide a flap that can be folded and stored in a minimum space without damage.

The foregoing and other objects of the invention are attained by an annular flap formed of an elastomeric composition permanently deformable under the heat and pressure encountered in service. The lateral portions of the flap are less than 1.5 mm. thick and thinner than the central portion. The central portion protects the inner tube from excessive heat generated during braking and the like and transmitted to the rim, and the lateral portions conform closely to the fine structure of the interior surface of the tire in the vicinity of the beads to prevent pinching of the inner tube between the flap and the tire.

BRIEF DESCRIPTION OF THE DRAWING

An understanding of additional aspects of the invention may be gained from a consideration of the following detailed description of several representative embodiments thereof, taken in conjunction with the accompanying figures of the drawing, in which.

DESCRIPTION OF THE PREFERRED EMBODIMENTS

Figure 1:
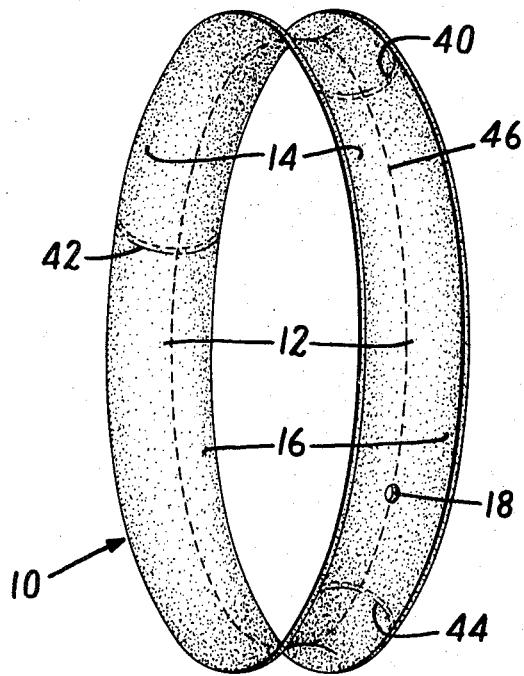
FIG. 1 is a perspective view of a novel flap constructed in accordance with the invention.
Figure 4:
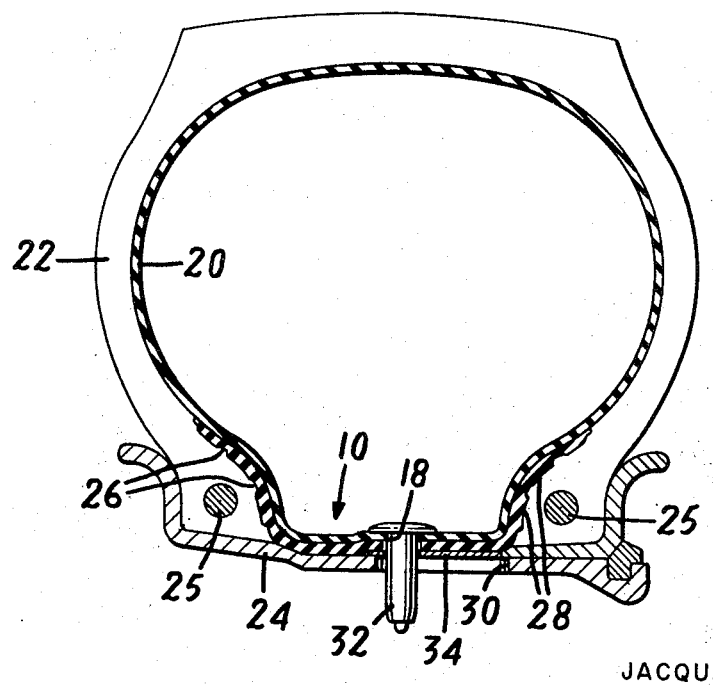
FIG. 4 is a fragmentary axial section of a flap constructed in accordance with the invention mounted in combination with a rim, tire, and inner tube.

FIG. 1 is a perspective view of a flap 10 constructed in accordance with the invention. The flap 10 is annular and has a central portion 12 and two lateral or wing portions 14 and 16 on opposite sides of the central portion 12. An aperture 18 is formed in the flap to accommodate the valve stem of an associated inner tube 20 (FIG. 4).

The structure of the flap 10 in axial section is of great importance. In accordance with the invention, as FIGS. 2 and 3 both illustrate, the central portion 12 of the flap 10 is thicker than the wing or lateral portions 14 and 16.

Figure 2:
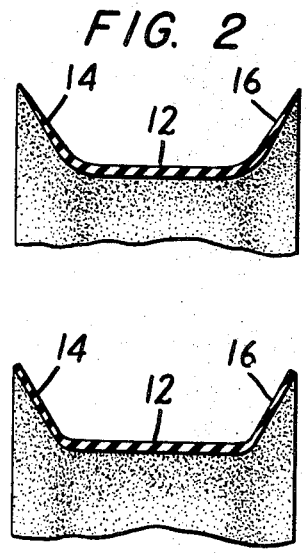
FIG. 2 is a fragmentary axial section of a flap constructed in accordance with the invention showing a first representative construction.
Figure 3:
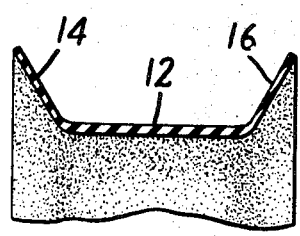
FIG. 3 is a view similar to FIG. 2 showing a second representative construction.

In the structure of FIG. 2, for example, the central portion may be 2.5 mm. thick, and in the construction of FIG. 3, the central portion 12 may be 2 mm. thick. In other embodiments, the central portion may be as much as 4 mm. thick.

The lateral portions 14 and 16 are in all embodiments of the invention thinner than the central portion 12. In the embodiment of FIG. 2, the lateral portions 14 and 16 taper to a minimum thickness of 0.8 mm. at their outer extremities. In the embodiment of FIG. 3, the lateral portions 14 and 16 have a substantially uniform thickness of 0.9 mm. throughout. In some embodiments of the invention, the lateral portions may be as little as 0.5 mm. thick.

The relatively thick central portion 12 protects the inner tube 20 from excessive heat generated during braking and the like and transmitted to the rim. The thin lateral portions conform closely to the fine structure of the interior surface of the tire in the vicinity of the beads to prevent pinching of the inner tube 20 between the flap and the tire.

In accordance with the invention, the material selected for the formation of the flap is permanently deformable under the heat and pressure encountered in service. Preferably, an elastomeric composition is employed comprising an ethylene-propylene copolymer or an ethylene-propylene terpolymer. Such elastomers provide good resistance to damage by heat and abrasion, good elasticity, and good resistance to aging. In addition, the resulting composition is adapted to become permanently deformed by the heat and pressure encountered in service.

The elastomer may be vulcanized by means of any suitable vulcanizing agent such as sulfur, peroxides, and phenolic resins, with or without the addition of an accelerator or catalyst. Further, additives such as carbon black, zinc oxide, plasticizers, and antioxidants may be used.

The following examples are representative mixtures suitable for the manufacture of flaps in accordance with the invention. The quantities indicated in the examples are parts by weight.

EXAMPLE 1

| Ingredient | Parts by weight |
| --- | --- |
| Ethylene-propylene elastomer manufactured by Esso and sold under the trademark EPR | 50 |
| Zinc oxide | 3 |
| Vaseline oil | 6 |
| Black HAF | 35.7 |
| Di-Cup 40 | 5 |
| Sulfur | 0.3 |
| Total | 100.0 |

EXAMPLE 2

| Ingredient | Parts by weight |
| --- | --- |
| Ethylene-propylene terpolymer elastomer manufactured by Esso and sold under the trademark EPT 3509 | 49.5 |
| Zinc oxide | 3 |
| Stearic acid | 0.5 |
| Naphthenic oil | 18 |
| Black HAF | 26 |
| Phenol-dialcohol resin | 3 |
| Total | 100.0 |

The mixture in accordance with Example 1 is vulcanized at a temperature of approximately 155° C. for 45 minutes; the mixture in accordance with Example 2 is vulcanized at the same temperature for approximately 60 minutes.

In place of the Vaseline oil of Example 1, any suitable liquid petroleum fraction having a viscosity within the range of 3 centistokes to 60 centistokes, preferably 12 to 30 centistokes, at 99° C; naphthenic oil specified in Example 2 should also have a viscosity within said range.

HAF is of course, a high abrasion furnace Black well known to those skilled in the art.

Di-Cup 40 is a registered trademark of Hercules Powder Company for a dicumyl peroxide, and other dicumyl peroxides may of course be substituted in Example 1.

The phenol-dialcohol resin recited in Example 2 may be a monocyclic or a multicyclic phenol dialcohol in which the para substituent is an alkyl, cycloalkyl, aryl or aralkyl radical. The molecular weight of the resin should be within the range of 200 to 2,000, preferably 1,000.

The proportion of ethylene to propylene in Examples 1 and 2 should be within the range of 20 to 85, preferably 25 to 60, by weight, and the proportion of the terpolymer to the total of the ethylene and propylene should be within the range of 0.5 percent to 15 percent. The terpolymer can be selected from a number of polymers including, for example, 1,4-hexadiene, cyclo-1,5-octadiene, dicyclopentadiene, methylene-norbornene, etc.

FIG. 4 shows the flap 10 in combination with an inner tube 20 and a tire 22 mounted on a rim 24. The interior surface of the tire 22 in the vicinity of the beads 25 is formed with ribs 26 alternating with depressions 28. These ribs and depressions extend circumferentially of the tire 22 for the purpose noted above of facilitating manufacture of the tire 22. In the drawing, the thickness of the flap 10 and the depth of the depressed portions 28 have been exaggerated for the sake of clarity.

The flap 10 of the invention has, as noted above, lateral portions which are thin and permanently deformable under the heat and pressure encountered in service. Accordingly, the flap 10 conforms closely to the contour of the inner surface of the tire 22 in the vicinity of the beads 25, neatly filling the depressions 28. The flap 10 does not gape away from the interior surface of the tire 22, and the flap 10 and tire 22 therefore do not pinch the inner tube 20.

The aperture 18 of the flap 10 shown in FIG. 1 appears also in FIG. 4 and is in register with an elongated aperture 30 in the rim 24. These apertures accommodate a valve stem 32 attached to the inner tube 20 to permit inflation of the inner tube 20 in the usual manner when it is mounted as shown in FIG. 4.

In order to prevent the inner tube 20 from causing the flap 10 to protrude into the aperture 30, the flap 10 is provided with a reinforcement 34 mounted adjacent to the aperture 18. The reinforcement 34 partially covers the aperture 30 and may be, for example, a small sheet metal plate. Alternatively, the reenforcement 34 may be made of reenforced rubber or rubberized fabric or any other material having sufficient rigidity and heat resistance.

The invention provides not only for a thinning down of the edges of the flap but also for a thinning in general of the entire flap, although the center portion of the flap always remains a little thicker than the lateral portions. Thus, the thickness may vary from 0.8 to 1.5 mm. at the edges and from 2 to 4 mm. in the center.

Owing to the general thinning down, there is obtained a very supple flap which can be folded for warehousing, packing or shipping with greatly reduced volume. In addition, the same flap may be used in combination with tires and rims of different sizes. Specifically, the thin lateral portions are adapted to contact tires of various sizes in the vicinity of the beads, the thicker portion of the flap extending over the entire width of the rim between the beads and also being capable of extending over the bead portion to some extent.

The flap of the invention may advantageously be made by molding so that the flap has the same cross-sectional outline (in axial planes) at all points of its circumference. For example, the cross-sectional outline at the location 40 (FIG. 1) is the same as that at the location 42 or 44. These cross sections are along meridians of the flap, since they are defined by the intersection of the flap with planes passing through the axis of rotation of the flap. The thickness of the flap 10 along each such cross section is nonuniform and within the range of from 4 mm. to 0.5 mm.

Along the parallels of the flap, defined by the intersections of planes normal to the axis of rotation of the flap with the flap, the thickness of the flap 10 is substantially uniform. Such a parallel 46 is shown in FIG. 1. At all points along this parallel, the flap has substantially the same thickness.

Of course, in the case of cross sections along meridians and cross sections along parallels, there is a departure from the relationships described above at the aperture 18. This aperture is quite small, however, compared to the flap 10, and the relationships set forth above are substantially applicable to the flap considered as a whole.

Thus there is provided in accordance with the invention a novel and highly effective flap for protecting the inner tube of a heavy-duty vehicle from damage by the tire and rim. Many modifications of the representative embodiments of the invention described above will readily occur to those skilled in the art. For example, other suitable elastomeric compositions can be produced by manipulation of the proportion or quality of the carbon black, reenforcing charges, or plasticizers, by the substitution of different elastomers, and by variation of the degree of vulcanization. Thus, butyl-type elastomer mixtures can be used with some success, inasmuch as they are capable of resisting heat. On the other hand, they have generally less favorable resistance to wear and tear than the mixtures described by way of example above.

Many other modifications within the spirit and scope of the invention will occur to those skilled in the art, and, accordingly, the invention is to be construed as including all of the modifications thereof.

I claim:

1. An annular flap to protect the inner tube of a heavy-duty vehicle from damage by the tire and rim, said flap being formed of an elastomeric synthetic composition permanently and quickly deformable under the heat and pressure encountered in service, the lateral portions of said flap being less than 1.5 mm. thick and thinner than the central portion, said central portion being substantially no greater than 4 mm. thick and protecting the inner tube from excessive heat generated during braking and the like and transmitted to the rim, and said lateral portions conforming closely to the fine structure of the interior surface of the tire in the vicinity of the beads to prevent pinching of the inner tube between the flap and the tire.

2. A flap as set forth in claim 1 in which said lateral portions are less than 1 mm. thick.

3. A flap as set forth in claim 1 in which said composition comprises an ethylene-propylene copolymer.

4. A flap as set forth in claim 1 in which said composition comprises an ethylene-propylene terpolymer.

5. A flap as set forth in claim 1 having a substantially uniform thickness along substantially all its parallels and a nonuniform thickness within the range of from 4 mm. to 0.5 mm. along substantially all its meridians.

6. A flap as set forth in claim 1 in which an aperture is formed in said flap for accommodating the valve stem of said inner tube and further comprising a reinforcement mounted adjacent to said aperture for preventing said inner tube when inflated from deforming said flap in the vicinity of said aperture.